No. 897,039. PATENTED AUG. 25, 1908.
A. VOGELSANG.
PROCESS FOR PURIFYING AND FILTERING WATER.
APPLICATION FILED APR. 23, 1907.
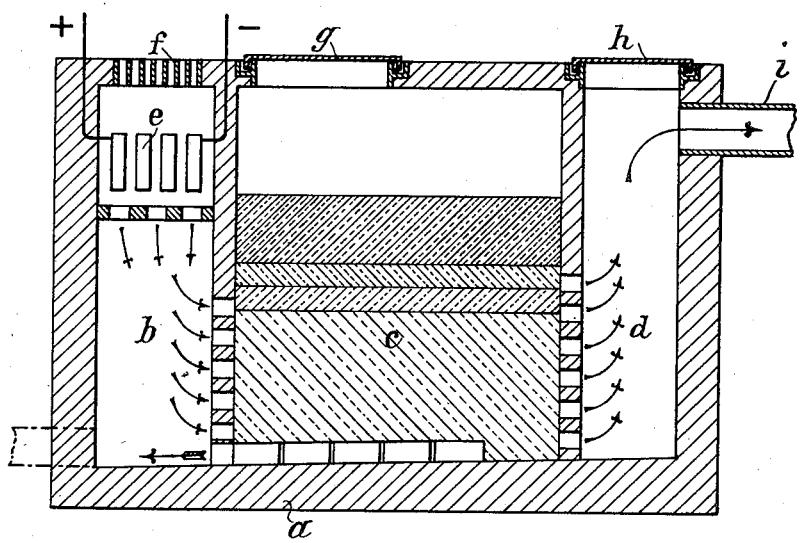
Witnesses
Chas H Smith
A. L. Serrell
Inventor
Alfred Vogelsang
by Harold Serrell
his atty.

UNITED STATES PATENT OFFICE.

ALFRED VOGELSANG, OF DRESDEN, GERMANY.

PROCESS FOR PURIFYING AND FILTERING WATER.

No. 897,039.　　　　Specification of Letters Patent.　　Patented Aug. 25, 1908.

Application filed April 23, 1907. Serial No. 369,713.

*To all whom it may concern:*

Be it known that I, ALFRED VOGELSANG, engineer, a subject of the King of Prussia, and resident of Dresden, Kaitzerstrasse 12, Kingdom of Saxony, German Empire, have invented a new and useful Process for Purifying and Filtering Water, of which the following is a specification.

The present invention relates to a process for purifying or filtering drainage water or sewage and also for the purification and sterilization of fresh water according to the biological purifying process.

If this filtering process is used for the purification of drainage water or of sewage, the purifying or oxidizing body preferably consists of slags of different sized grains applied in layers, which layers are preferably built up in such a manner that the size of the grain is gradually reduced from the bottom to the top, and there is provided on the top of said slags a layer of very fine slag. Through an oxidizing or purifying body, built up as described above, the sewage passes from the top to the bottom, whereas for the purpose of obtaining an active biological process, fresh atmospheric air is admitted and passed through the oxidizing body, in a different direction to that in which the sewage passes. It has thus been found that in purifying plants built up in this manner, it only requires about one and one-half to three square yards of the purifying body to thoroughly purify about one cubic yard of the sewage or drainage water.

Now according to the present invention, ozone is added to the fresh atmospheric air in small quantities to make the oxygen contained in the air more active and effective for the purpose of accelerating the biological purifying process as well as of reducing the size of the purifying or oxidizing body as much as possible. This addition of ozone is only made in small quantities in such a manner that the microbes contained in the oxidizing body for the purpose of effecting the biological purifying process are not killed, and the purifying process is in no way disturbed. If it is found though, when using the oxidizing body, that pathogenous microbes are contained in the water, when purified, a larger quantity of ozone may be added for a short time for the purpose of killing the pathogenous microbes.

If the purifying body is used for the purification and sterilization of fresh water, no slag is used in building up the purifying body, but preferably porous chamotte or the like of different sizes, on the top of which, for the purpose of filtering the fresh water, a fine layer or cover of sand is provided. After filtering the fresh water by means of said top sand cover, the same will pass through the purifying body in drops, whereas the fresh atmospheric air with the added ozone will pass preferably from one side to the other through the purifying body and in this manner the oxygen, the activity of which is increased by the ozone, will effect a thorough sterilization of the water within a short time and with the use of the smallest possible size of purifying body.

The accompanying drawing shows an oxidizing or purifying plant according to the present invention.

*a* is the casing surrounding the whole purifying plant and preferably divided into three partitions, namely, the inlet shaft *b*, the purifying body *c* and the outlet shaft *d*. Within the inlet shaft *b* and near the top of the same, there is fixed an ozonizer *e* of any well known type, through which the fresh air entering into the shaft at *f* will have to pass before entering the purifying body. The ozonizer is preferably worked by electricity and as a very small current is required for effecting a good ozonization of the air, the same works very economically. By means of the ozonizer inserted into the inlet shaft, the entire air draft to the purification body is equally mixed with the ozone, the oxygen of which is thus made more active and effective and thereby highly adapted to increase the oxidation or purification of the sewage water within the purifying body. It is also possible to let the air only partly pass through the ozonizer and mix such ozonized air with fresh air, as the principal feature always remains an equal distribution of the ozone within the fresh air.

The top of the purifying plant *c*, as well as of the outlet shaft *d*, is preferably covered with iron lids at *g* and *h*. With the purifying plant shown on the accompanying drawing, the air passes through the purifying body horizontally to the outlet shaft *d* and away by the pipe *i*, but as will be understood, the air may be caused to pass vertically and any suitable arrangement known in purifying plants of this character may be employed without altering the gist of the present invention, which consists in ozonizing the fresh air before it enters the purifying body.

As hereinbefore stated, the ozonized air may be passed through the purifying body in any desired direction and a more active draft may be produced if required, by any mechanical means,—for instance, by the use of a blower.

The main feature of the invention in purifying or filtering plants, as described, consists in the fact that to the air used for the oxidizing purpose, ozone is added in smaller or larger quantities according to whether drainage or sewage water or fresh water is to be purified or sterilized.

I claim as my invention:

1. The herein described process for purifying and filtering water according to a biological purifying process, consisting in passing the material to be purified or filtered through a purifying or oxidizing body, adding ozone in small quantities to fresh air for the purpose of rendering the oxygen in the latter more active and effective without disturbing the biological process, and then passing the ozonized air through the purifying or oxidizing body in a direction different to that in which the material to be filtered or purified passes.

2. The herein described process for purifying and filtering water according to biological purifying process, consisting in passing the material to be purified or filtered through a purifying or oxidizing body, adding ozone in small quantities to fresh air for the purpose of rendering the oxygen in the latter more active and effective without disturbing the biological process, and then passing the ozonized air through the purifying or oxidizing body in a direction at right angles to that in which the material to be filtered or purified passes.

In testimony, that I claim the foregoing as my invention, I have signed my name in presence of two witnesses, this ninth day of April, 1907.

ALFRED VOGELSANG.

Witnesses:
PAUL ARRAS,
CLÄRE SIMON.